United States Patent [19]

Nishida et al.

[11] Patent Number: 5,654,348
[45] Date of Patent: Aug. 5, 1997

[54] FLEXIBLE COMPOSITE REINFORCING MATERIAL FOR OPTICAL FIBER CABLES

[75] Inventors: Mika Nishida; Hiroshi Kawashima; Arata Iwasaki, all of Kobe, Japan

[73] Assignee: Kabushiki Kaisha Kobe Seiko Sho, Kobe, Japan

[21] Appl. No.: 422,910

[22] Filed: Apr. 17, 1995

[30] Foreign Application Priority Data

Apr. 28, 1994 [JP] Japan ................... 6-092168

[51] Int. Cl.$^6$ ........................... C08F 2/46
[52] U.S. Cl. ............... 522/15; 522/176; 522/182
[58] Field of Search ............. 522/15, 170, 182

[56] References Cited

U.S. PATENT DOCUMENTS

| | | | |
|---|---|---|---|
| 4,427,823 | 1/1984 | Inasaki et al. | 524/833 |
| 5,476,748 | 12/1995 | Steinmann et al. | 430/269 |
| 5,496,870 | 3/1996 | Chawla et al. | 522/90 |

*Primary Examiner*—Helen Lee
*Attorney, Agent, or Firm*—Oblon, Spivak, McClelland, Maier & Neustadt, P.C.

[57] ABSTRACT

A high-performance composite reinforcing material for optical fiber cables, exhibiting excellent protective effect when incorporated into a reinforcing component of optical fiber cables, and having a degree of flexibility applicable to curved wiring of a small radius of curvature.

2 Claims, No Drawings

FLEXIBLE COMPOSITE REINFORCING MATERIAL FOR OPTICAL FIBER CABLES

BACKGROUND OF THE INVENTION

1. Field of the Invention

The present invention relates to a composite reinforcing material having excellent strength and flexibility for optical fiber cables, the material being produced by composing a particular resin with a fiber reinforcing material.

2. Prior Art

Reinforcing materials for optical fiber cables are known, for example, a composite of a fiber reinforcing material with a thermosetting resin through pultrusion and a composite of a reinforcing material capable of transmitting active ray such as ultraviolet ray with a photo-setting resin through shaping and subsequent curing via ultraviolet ray.

An improved example of the former is disclosed in Japanese Patent Application No. Sho 62-90229, wherein the method comprises coating with a thermoplastic resin a reinforcing material impregnated with a thermosetting resin, thereafter curing the thermosetting resin under heating, and subsequently removing the coated thermoplastic resin. Compared with a routine pultrusion method, the method can increase the production velocity, but requires more complex production equipment and is not suitable for speedy production because additional processes are needed such as coating of a thermoplastic resin and removal thereof after thermosetting.

Alternatively, use has been made of hard and high-strength reinforcing materials for optical fiber cables, including those such as the known examples described above. However, as communications systems have been distributed commonly in company equipment and public equipment and also even into general houses and the cables therefore should essentially be laid out interiorly, a serious problem has occurred in the layout of a known reinforcing material of a high rigidity. In other words, so as to realize wiring in a relatively small interior, use should be made of a reinforcing material, stably exhibiting excellent protective effect when incorporated into a reinforcing component of optical fiber cables, and having a degree of flexibility applicable to curved wiring of a small radius of curvature. Nevertheless, conventional reinforcing materials are generally hard and rigid, lacking flexibility, so that they are defective in interior wiring applicability.

Further, (metha)acrylic resins have been known as a representative active-ray curing resin, but the resins are problematic because they have such a larger polymerization shrinkage that they are poor in the adhesion to fiber reinforcing materials and therefore defective in the reinforcing effect.

Additionally, it cannot be said that the resins are suitable for curved wiring because they are generally hard and fragile. Epoxy resins commonly employed as a resin for composite reinforcing materials are excellent in terms of adhesion to reinforced fibers and flexibility, but the resins are poor in active ray-curability. Therefore, drawbacks have been remarked for the productivity thereof as a composite reinforcing material because of the poor active ray-curability.

Thus, a method has been investigated to improve the desired characteristics described above by a combined use of an epoxy resin and an acrylic resin to exhibit the characteristics of the two in a suitable fashion, and such a composite resin of an ultraviolet ray-curable type is disclosed in Japanese Patent Laid-open No. Hei 4-314721. The composite resin contains an aromatic epoxy resin, an epoxy resin containing both of a cyclohexene oxide group and an alkylene oxide group in the molecule thereof, an acrylate compound and a polymerization initiator at a specific ratio, and is characteristic in that the resin has such a small polymerization shrinkage during curing as well as such a higher curing sensitivity that the resin is readily cured into its depth. Thus, the resin is excellent as a casting resin. However, the resin is not intended for composition with fiber reinforcing materials, and the resin therefore is not satisfactory in terms of adhesion to fiber reinforcing materials and flexibility. Accordingly, it cannot be said that the resin can satisfy the objective of the present invention.

SUMMARY OF THE INVENTION

Focusing on the prior art problems, the present invention has been carried out. Investigations have been carried out of a resin, exhibiting excellent reinforcing performance at a state when the resin is composed with a fiber reinforcing material and having less shrinkage during curing and excellent adhesion to the fiber reinforcing material, and being highly flexible. The objective of the present invention is to provide a high-performance composite reinforcing material for optical fiber cables, exhibiting excellent protective effect when incorporated into a reinforcing component of optical fiber cables, and having a degree of flexibility applicable to curved wiring of a small radius of curvature.

To solve the aforementioned problems, a composite reinforcing material for optical fiber cables is produced in accordance with the present invention, by impregnating an active ray-transmittable fiber reinforcing material with a resin composition containing as essential ingredients;

- (a) 30 to 90 parts by weight of one or more selected from the group consisting of mono(metha)acrylate of aliphatic alcohol, mono(metha)acrylate of alkylene glycol or polyalkylene glycol, mono(metha)acrylate added alkylene glycol- or polyalkylene glycol of polybasic acid;
- (b) 10 to 70 parts by weight of one or more selected from the group consisting of diglycidyl ether of alkylene glycol added bisphenol A, diglycidyl ether of polyalkylene glycol added bisphenol A, diglycidyl ether of alkylene glycol, and diglycidyl ether of polyalkylene glycol;
- (c) 0.1 to 5 parts by weight of a radical polymerization initiator generating radicals via ultraviolet ray irradiation; and
- (d) 0.2 to 4 parts by weight of a cation polymerization initiator generating cations via ultraviolet ray irradiation; and subjecting the resulting resin to active ray irradiation for curing the resin. Herein, a preferable amount of a fiber reinforcing material to be composed with a resin composition is in a range of 400 to 900 parts by weight to 100 parts by weight of a resin composition in total.

As described above, in accordance with the present invention, an active ray-transmittable fiber reinforcing material is impregnated with a resin composition containing a specific ratio of the following components as essential ingredients;

- (a) one or more selected from the group consisting of mono(metha)acrylate of aliphatic alcohol, mono(metha)acrylate of alkylene glycol or polyalkylene glycol, mono(metha)acrylate added ylene glycol- or polyalkylene glycol added of polybasic acid such as succinic acid;

(b) one or more selected from the group consisting of diglycidyl ether of alkylene glycol added bisphenol A, diglycidyl ether of polyalkylene glycol added bisphenol A, diglycidyl ether of alkylene glycol, and diglycidyl ether of polyalkylene glycol;

(c) a radical polymerization initiator generating radicals via ultraviolet ray irradiation; and (d) a cation polymerization initiator generating cations via ultraviolet ray irradiation;

to cure the resin via active ray irradiation. The resin composition can be cured in a short period of time because the resin is excellent in terms of radiation-curing property. Furthermore, the resulting composite reinforcing material is quite adhesive to a fiber reinforcing material and a reinforced resin, so the composite material exhibits excellent protective effect when incorporated into a reinforcing material for optical fiber cables. Additionally, the resin component after curing has a higher degree of flexibility, so the resulting composite reinforcing material is excellent in flexibility and can exhibit flexibility suitable for interior wiring when the material is curved.

In accordance with the present invention, the component (a), ie. one component unit of a flexible acrylic resin after curing, should have one (metha)acryloyl group in the molecule so as to exhibit sufficient flexibility at a cured state. When a monomer having two or more (metha)acryl group is used, the cross-linking density of a cured resin is too much increased to generate a flexible resin which is intended in the present invention. Furthermore, as such (metha)acrylate, the one having a longer principal linear chain should be selected so as to increase the flexibility as a cured product. Specifically, use is made of mono(metha)acrylate of an aliphatic alcohol having 5 or more carbon atoms, mono (metha)acrylate of alkylene glycol (or polyalkylene glycol), mono(metha)acrylate added alkylene glycol- or polyalkylene glycol of polybasic acid such as succinic acid.

More specifically, preferable such examples include an aliphatic (metha)acrylate such as iso-decyl (metha)acrylate, iso-octyl (metha)acrylate, undecyl (metha)acrylate, lauryl (metha)acrylate, myristyl (metha)acrylate, heptadecyl (metha)acrylate, stearyl (metha)acrylate, nonadecyl (metha) acrylate, and the like; mono(metha)acrylate of alkylene glycol such as ethylene glycol, propylene glycol, butylene glycol and the like; mono(metha)acrylate of polyalkylene glycol such as di-, tri-, tetra-, hexa-, hepta-glycol; and (metha)acrylate of polybasic acid such as succinic acid, tartaric acid, maleic acid and the like added alkylene glycol or polyalkylene glycol as those described above.

Without departing from the scope of the present invention, these (metha)acrylates may include those introduced with ether bond, ester bond, excluding (metha) acrylester bond, urethane bond and the like.

Among the (metha)acrylates, preference is given to mono (metha)acrylate of polyalkylene glycol and (metha)acrylate of polyalkylene glycol addition product of polybasic acid because the hydroxyl groups and carboxyl groups contained therein react with the diglycidyl ether as the component (b) to enhance the composing effect when they are used.

The amount of the component (a) to be composed should be selected from a range as weight ratio of 30 to 90 parts by weight to 100 parts by weight of the resin composition in total; when the amount of the component (a) to be composed is insufficient, problems occur such as the decrease of the curing velocity of the resin and the remaining tacks after active ray irradiation, while above 90 parts by weight, the absolute amount of the component (b) is so insufficient that the resin itself turns hard and fragile. In any case, the flexibility required for a reinforcing material is not satisfactorily realized, and therefore, the objective of the present invention cannot be achieved. From such respect, the amount of the component (a) to be composed is preferably in a range of 30 to 90 parts by weight, more preferably in a range of 40 to 80 parts by weight.

Herein, it is required that the component (b), a component unit of a flexible epoxy resin after curing, should be selected from those having an alkylene glycol unit, such as ethylene glycol and propylene glycol, or a polyalkylene glycol unit in the molecules, specifically including diglycidyl ether of alkylene glycol, diglycidyl ether of alkylene glycol added bisphenol A, diglycidyl ether of polyalkylene glycol, and diglycidyl ether of polyalkylene glycol added bisphenol A, all being used singly or two or more thereof being used in combination if necessary.

Among the same glycidyl ether family, monoglycidyl ether tends to produce a cured product of a resin composition composed with the component (a), having an insufficient strength which cannot exhibit satisfactory protective effect of optical fiber cables; multi-functional glycidyl ether which have 3-or move glycidyla glycidyl ether of multifunctionality of tri- or more, produces a resin composition composed with the component (a), having a far higher cross-linking density to decrease the flexibility of a cured product. Therefore, the initial objective cannot be achieved.

The amount of the component (b) to be composed should be selected from a range as weight ratio of 10 to 70 parts by weight to 100 parts by weight of the resin composition in total; when the amount of the component (b) to be composed is insufficient, the resinous cured product gets hard and fragile, so that the flexibility as a reinforcing material is likely to be insufficient. Alternatively, when the amount is excessive above 70 parts by weight, problems occur in that the absolute amount of the component (a) is insufficient to decrease the curing velocity of the resin and that tacks remain on the surface after active ray irradiation. Therefore, the objective of the present invention cannot be met by any of the cases. From such respect, the amount of the component (b) to be composed is preferably in a range of 10 to 70 parts by weight, more preferably in a range of 20 to 60 parts by weight.

For an initiator to polymerize the components (a) and (b), a radical polymerization initiator (component (c)) generating radicals via active ray irradiation should be used in combination with a cation polymerization initiator (component (d)) generating cations via active ray irradiation, as described above. The reason is as follows.

In accordance with the present invention wherein the components (a) and (b) are used as polymerizable monomer components, the single use of the component (c) or (d) as such polymerization initiator preferentially initiates the polymerization of either one of the above components (a) or (b), and therefore, the effect of the combination of the monomer components cannot be exerted. Consequently, a composite reinforcing material, having the protective effect of optical cables as well as flexibility as intended in accordance with the present invention, cannot be generated.

So as to effectively exhibit the effect of such combination of polymerization initiators, then, the components (c) and (d) should be selected in a range of 1 to 5 parts by weight and 0.2 to 4 parts by weight, respectively, to 100 parts by weight of a resin composition; if individual amounts to be composed are below the lower limits, the polymerization velocities of the components (a) and (b) get slow, so that curing requires a longer period of time or curing is insufficient; alternatively, if individual amounts to be composed are increased too much, the polymerization velocities do not get larger proportionally, so that expensive such initiators are consumed uselessly, which is not economical.

So as to polymerize the components (a) and (b) in a balanced manner to effectively exhibit the effect of the combination of the components (a) and (b), the component (c) should be selected from a range of 0.1 to 5% by weight of the component (a) while the component (d) should be selected from a range of 0.2 to 4% by weight of the component (b).

For the radical polymerization initiator to be used herein, use may be made of any type of such initiators generating radicals via active ray irradiation, preferably including benzoin methyl ether, diethoxyacetophenone, 1-phenyl-1-hydroxy-2-methylpropan-1-one, 1-hydroxycyclohexylphenyl ketone, thiophenemorpholinopropane, benzyldimethylketal, acylphosphine oxide and the like. Also, for the types of cation polymerization initiators, any type of such initiators generating cations via active ray irradiation can be used without limitation, preferably including aryldiazonium salts, diaryliodonium salts, triarylphosphonium salts and the like, all of which generate Louis acids via active ray irradiation.

For active ray, ultraviolet ray generated from a mercury lamp or a metal halide lamp is the most common, but use may be made of other types of ray including visual ray and electron beam as well as sun beam.

The essential components to be used in the resin composition of the present invention are the four components described above, but if necessary, use may be made of smaller amounts of a silicone resin, a liquid elastomer, an antioxidant, a non-reactive filler, a polymerization prohibiting agent, a dye and a pigment in combination in the resin composition without departing from the characteristics of the present invention. If these additives are poor in miscibility with the essential components such as (a) and (b), the curing property and physical property of a cured product may potentially be deteriorated, so that a combined use of smaller amounts of compatible such components should be preferable.

For a fiber reinforcing material for impregnation of a resin composition, an active ray-transmittable fiber is selected for use, so as to transmit active ray at its composed state after impregnation without suppressing the curing of the resin composition via active ray. Among those reinforcing materials capable of transmitting active ray, glass fiber is the most common, which additionally exhibits the most excellent performance. Furthermore, use may be made of ultraviolet ray- transmittable synthetic resins such as olefin resin, polyamide resin such as Nylon, polyester resin, acrylic resin and the like. These fiber reinforcing materials may be used in combination of two or more if necessary.

The amount of the resin composition for impregnation to the amount of the fiber reinforcing material is not specifically limited, but generally, the amount of a fiber reinforcing material is in a range of 400 to 900 parts by weight of 100 parts by weight of the resin composition. If the amount of a fiber reinforcing material to be composed is insufficient, the strength as a composite reinforcing material is likely to be less, causing a tendency that the effect of increasing the strength of optical fiber cables is unsatisfactory; in contrast, if the amount is too much, the flexibility is insufficient because of the shortage of a matrix resin, causing difficulty in achieving the initial objective of the present invention to enhance the potential of curved wiring.

Impregnating the fiber reinforcing material with the resin composition and subjecting the composition to active ray irradiation, after shaping if necessary, to cure the resin composition, the resin composition is polymerized in a short period of time to strongly compose the fiber reinforcing material and the cured resinous product together integrally, whereby a composite reinforcing material for optical fiber cables can be generated at a higher productivity, which is excellent in terms of strength and flexibility and has superior protective effect on optical fiber cables and is naturally applicable to curved wiring.

EXAMPLES

The construction and effects of the present invention will be explained in details in examples, but the invention is not limited to the examples below.

Example 1

Mixing 50 parts by weight of 2-acryloyloxyethyl succinate as the component (a) with 50 parts by weight of diglycidyl ether of propylene glycol added bisphenol A as the component (b), followed by addition of 1.5 parts by weight of Irgacure 651 (manufactured by Ciba-Geigy, Co. Ltd.) as a radical polymerization initiator as the component (c) and 1.5 parts by weight of UVI-6970 (manufactured by UCC Company) as a cation polymerization initiator as the component (d) for uniform mixing, a liquid resin composition was prepared. Impregnating E glass roving with the resin composition in liquid (the impregnating amount of the resin was 68% by weight as a ratio to the cured composite reinforcing material) and curing the resin via 120 W/cm ultraviolet ray irradiation, a composite reinforcing material of a 0.9-mm diameter for optical fiber cables was produced. The resulting composite reinforcing material was subjected to physical tests according to the following methods, and the results are shown in Table 1.

MIT bending test

Repeatedly applying bending to a reinforcing material in a direction of 90 degrees under the application of a 1-kg weight, the number of the application of bending until the material is ruptured is determined. When the number is 100 or more, that number is taken as the standard that the material is designated apparently "good".

Tensile test

Elongating a reinforcing material in a linear direction, the strength at which the material is ruptured is divided by the cross section, and the resulting value is used for evaluation.

Those with a value of 100 kg/mm$^2$ or more are designated "good".

A composite reinforcing material for optical fiber cables is produced in the same manner as in Example 1 described above, except that the types and amounts of the components (a), (b), (c) and (d) to be composed are modified as follows. The results of the physical tests are shown concurrently in Table 1.

Example 2

| | |
|---|---|
| Component (a) Iso-octyl acrylate "part(s) by weight" is hereinafter abbreviated as "wt part(s)".) | 40 parts by weight |
| Component (b) Diglycidyl ether of propylene glycol modified bisphenol A | 60 wt parts |
| Component (c) Irgacure 651 | 1.2 wt parts |
| Component (d) UVI-6970 | 1.8 wt parts |

Example 3

| | |
|---|---|
| Component (a) 2-Acryloylethyloxy succinate | 50 wt parts |
| Component (b) Diglycidyl ether of propylene glycol | 50 wt parts |
| Component (c) Irgacure 651 | 1.5 wt parts |
| Component (d) UVI-6970 | 1.5 wt parts |

A reinforcing material was produced under the same conditions as in Example 1, except that the following components were employed. The individual physical tests were done.

Example 4

| | |
|---|---|
| Component (a) Ethylene glycol monoacrylate | 50 wt parts |
| Component (b) Diglycidyl ether of propylene glycol modified bisphenol A | 50 wt parts |

Example 5

| | |
|---|---|
| Component (a) Acryloylethyloxy succinate | 30 wt parts |
| Octyl acrylate | 20 wt parts |
| Isodecyl acrylate | 10 wt parts |
| Component (b) Diglycidyl ether of propylene glycol modified bisphenol A | 50 wt parts |

Example 6

A reinforcing material was produced in the same manner as in Example 1, except that the amounts of the components (a) and (b) were modified to 80 and 20 parts by weight, respectively.

Example 7

A reinforcing material was produced in the same manner as in Example 1, except that the amounts of the components (a) and (b) were modified to 40 and 60 parts by weight, respectively.

Example 8

A reinforcing material was produced in the same manner as in Example 1, except that the amounts of the components (a) and (b) were modified to 30 and 70 parts by weight, respectively.

Example 9

A reinforcing material was produced in the same manner as in Example 1, except that the amounts of the components (c) and (d) were modified to 0.1 and 0.2 part by weight, respectively.

Example 10

A reinforcing material was produced in the same manner as in Example 1, except that the amounts of the components (c) and (d) were modified to 5 and 4 parts by weight, respectively.

Comparative Example 1

| | |
|---|---|
| Component (a) 2-Acryloylethyloxy succinate | 0 wt part |
| Component (b) Diglycidyl ether of propylene glycol modified bisphenol A | 100 wt parts |
| Component (c) Irgacure 651 | 0 wt part |
| Component (d) UVI-6970 | 3 wt parts |

Comparative Example 2

| | |
|---|---|
| Component (a) 1, 6-Hexanediol diacrylate | 50 wt parts |
| Component (b) Epicoat 828 (manufactured by Yuka Shell, Co. Ltd.) | 50 wt parts |
| Component (c) Irgacure 651 | 1.5 wt parts |
| Component (d) UVI-6970 | 1.5 wt parts |

Comparative Example 3

A reinforcing material was produced in the same manner as in Example 1, except that the amounts of the components (c) and (d) were modified to 2 and 0 parts by weight, respectively.

Comparative Example 4

A reinforcing material was produced in the same manner as in Example 1, except that the amount of a reinforcing fiber was 300 parts by weight to 100 parts by weight of the resin composition.

Comparative Example 5

A reinforcing material was produced in the same manner as in Example 1, except that the amount of a reinforcing fiber was 1,000 parts by weight to 100 parts by weight of the resin composition.

Comparative Example 6

A reinforcing material was produced in the same manner as in Example 1, except that the amounts of the components (a) and (b) were modified to 90 and 5 parts by weight, respectively.

TABLE 1

| Example No. | Tensile strength ($kg/mm^2$) | Number needed for rupture at MIT bending test |
|---|---|---|
| 1 | 155 | 1050 |
| 2 | 130 | 1200 |
| 3 | 140 | 850 |
| 4 | 135 | 1000 |
| 5 | 160 | 900 |
| 6 | 160 | 500 |
| 7 | 140 | 1100 |
| 8 | 100 | 200 |
| 9 | 145 | 1200 |
| 10 | 150 | 1000 |
| Comparative Example | | |
| 1 | insufficient curing | — |
| 2 | 185 | 20 |
| 3 | 80 | 50 |
| 4 | 80 | 800 |
| 5 | 180 | 5 |
| 6 | 180 | 20 |

As apparently shown in Table 1, higher tensile strength is shown in Examples 1 to 10 satisfying the requirements of the present invention, compared with Comparative Examples 1 to 6.

Additionally, the results of MIT bending tests are far more excellent in the Examples, which show that those in Examples 1 to 10 have great flexibility. The present invention is constructed as described above, and by defining the types and combination of monomer components constructing a resin for impregnation and using appropriate amounts of a radical initiator and a cation initiator in combination, thereby greatly enhancing the curing characteristics of the resin via active ray as well as the flexibility of a cured product, a composite reinforcing material for optical fiber cables can be provided with a higher strength and flexibility in combination with an active ray-transmittable fiber reinforcing material.

What is claimed is:

1. A composite reinforcing material for optical fiber cables, produced by impregnating a resin composition consisting essentially of the following components per 100 parts of the resin composition;

(a) 30 to 90 parts by weight of one or more selected from the group consisting of mono(metha)acrylate of aliphatic alcohol, mono(metha)acrylate of alkylene glycol or polyalkylene glycol, mono(metha)acrylate added alkylene glycol of polybasic acid, and mono(metha)acrylate added polyalkylene glycol of polybasic acid;

(b) 10 to 70 parts by weight of one or more selected from the group consisting of diglycidyl ether of alkylene glycol added bisphenol A, diglycidyl ether of polyalkylene glycol added bisphenol A, diglycidyl ether of alkylene glycol, and diglycidyl ether of polyalkylene glycol;

(c) 0.1 to 5 parts by weight of a radical polymerization initiator generating radicals via ultraviolet ray irradiation; and (d) 0.2 to 4 parts by weight of a cation polymerization initiator generating cations via ultraviolet ray irradiation;

into an active ray-transmittable fiber reinforcing material and thereafter subjecting the resulting resin to active ray irradiation.

2. A composite fiber reinforcing material according to claim 1, produced by composing 400 to 900 parts by weight of an active ray-transmittable fiber reinforcing material with 100 parts by weight of a resin composition in total.

* * * * *